Sept. 17, 1940.  B. C. PLACE  2,215,428

FASTENER

Filed July 6, 1937

Inventor
Bion C. Place

By  Strauch & Hoffman
Attorneys

Patented Sept. 17, 1940

2,215,428

UNITED STATES PATENT OFFICE 2,215,428

FASTENER

Bion C. Place, Detroit, Mich., assignor of one-half to George E. Gagnier, Detroit, Mich.

Application July 6, 1937, Serial No. 152,182

2 Claims. (Cl. 24—215)

The present invention relates to one-piece wire spring stud fasteners. More particularly, the invention is concerned with a fastener, such as that just referred to, having a novel form of head adapting it to secure advantageous results.

A primary purpose of the present invention is to provide an improved one-piece wire spring stud fastener designed so as to permit the fasteners to be supplied in bulk to a hopper of an automatic feeding machine without serious tangling of the fasteners, thus permitting a feeding of the fasteners by machine.

A further object of the invention is to provide an improved one-piece wire spring stud fastener having a head consisting of a pair of spaced interconnected or interrelated loops constructed from a part of a piece of wire, and a shank consisting only of two outwardly bowed legs constructed of the remainder of said piece of wire, the legs being arranged so that they are carried respectively by the loops and disposed substantially directly beneath said loops, and in a plane normal to the head that passes through the centers of said loops.

Another object of the invention is to provide an improved one-piece wire spring stud fastener constructed of flat wire, having a width at least several times as great as the thickness of the flat-wire, the wire being bent to form the head so that the thickness of the head corresponds to the thickness of the wire, and the shank being bent so that the thickness of each leg corresponds to the minor dimension of the flat wire, thus producing a fastener having a high degree of stiffness proportionately to the amount of metal entering into its construction.

Still another object of the invention is to provide an improved molding and fastener combination in which the fastener is assembled with respect to the molding in a novel manner, and in such a way as to permit the use of a number of like fasteners with moldings of very small size and having very little space between the inturned flanges thereof.

Further objects of the invention will appear as the description thereof proceeds with reference to the accompanying drawing, in which Figures 1 and 2 are respectively side and plan views of a wire fastener, including the present invention and constructed in a preferred manner.

Like reference characters indicate like parts throughout the several figures.

Figure 1:
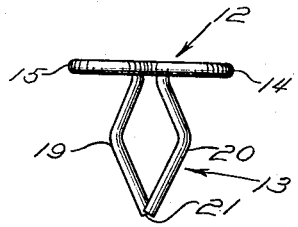
Figure 2:
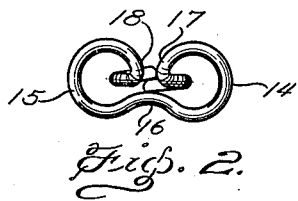

Referring to Figures 1 and 2, the fastener of these figures consists of a head 12 and a shank 13. The fastener is constructed from a piece of ordinary round wire, which is first bent into the illustrated form and then tempered, as is customary with devices of this character. The head 12 is formed from the mid-portion of the piece of wire and constitutes two loops 14 and 15, disposed in spaced relation and connected together by a connecting portion 16 constituting the mid-portion of the wire. The loops 14 and 15 include arms 17 and 18 extending inwardly in the plane of loops, and from the ends of which depend the outwardly bowed legs 19 and 20 formed from the ends of the piece of wire. The ends of the legs 19 and 20 overlap at 21 so that the legs can pass each other in scissors-like fashion.

The fasteners just described have been found not likely to become entangled with others of the same kind when quantities of the fasteners are supplied to the hopper of an automatic fastener feeding machine. This is one of the principal advantages of a fastener bent as just described.

Figure 3:
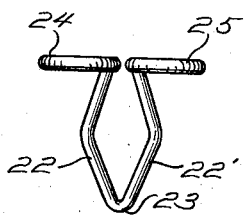
Figures 3 and 4 are respectively side and plan views of a modified form of fastener, in which the head is formed from the ends of the wire and the shank from the mid-portion, rather than the reverse arrangement.
Figure 4:

Instead of forming the head from the mid-portion of the wire and the shank from the ends, the fastener may be constructed as illustrated in Figures 3 and 4, in which the shank consists of two outwardly bowed legs 22 and 22' connected together at the entering point of the shank 23 and formed from the mid-portion of the piece of wire. The ends of the wire are bent in a plane at right angles to the plane of the shank forming spaced loops 24 and 25 formed from the ends of the piece of wire. The loops 24 and 25 are disposed in the same plane with the tips of the wire 26 and 27 in closely spaced relation as illustrated in Figure 4. Of course, in this form of the invention the legs constituting the shank of the fastener bend at the entering point of the shank 23, whereas in the fastener illustrated in Figures 1 and 2, each leg flexes independently of the other placing the arms 17 and 18 under torsion.

The fastener of Figures 3 and 4 is more flexible than that of Figures 1 and 2, but the stiffness of the fastener of Figures 3 and 4 is increased when the tips of the wire ends 26 and 27 contact with each other when the shank of the fastener is contracted. Upon contact of said tips, it is necessary to distort the loops 24 and 25 to further contract the fastener, thus adding to the stiffness of the shank or entering part.

Figure 5:
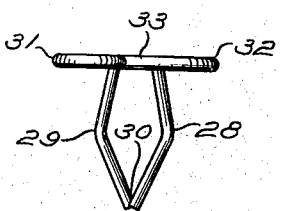
Figures 5 and 6 are respectively side and plan views of a still further modified form of fastener.
Figure 6:

Referring to the modification illustrated in Figures 5 and 6, the shank is formed from the ends of the piece of wire and includes outwardly bowed legs 28 and 29 that are free to pass each other at 30, the entering part of the tip, in scissors fashion as in the form of the invention illustrated in Figures 1 and 2. The head consists of two loops 31 and 32 connected together in spaced relation by a curved connecting portion 33 extending from one side of the loop 31 to the opposite side of the loop 32 forming, in effect, a head simulating the numeral 8 in form. The arms 34 and 35 of the loops 31 and 32 carry the depending legs 28 and 29, and are put under torsion during the contracting of the shank of the fastener.

Figure 7:
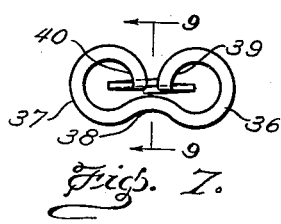
Figures 7 and 8 are respectively side and plan views of a still further modified form of fastener constructed from a piece of flat wire having a width at least several times as great as the thickness of the wire.
Figure 8:
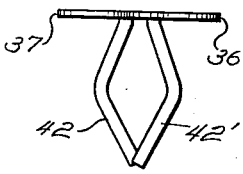
Figure 9:
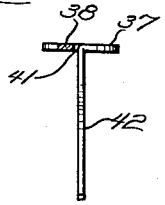
Figure 9 is a sectional view taken on the plane indicated by the line 9—9 in Figure 8, looking in the direction of the arrows.

In Figures 7, 8 and 9, a still further modified form of fastener is shown constructed from flat wire having a width at least twice the thickness of the metal from which the wire is made. The head in these figures comprises loops 36 and 37 connected together in spaced relation by a connecting portion 38, said loop being formed by bending the flat wire edgewise. The loops 36 and 37 carry inwardly extending arms in the plane of said loops 39 and 40, likewise formed by bending the flat metal strip edgewise. The ends of the wire are then turned into planes normal to the plane of the head by bends 41 made sidewise of the flat wire. The depending legs 42 and 42' thus formed are bowed outwardly by again bending the flat blank edgewise at the end of the shank, and the legs 42 and 42' are disposed in slightly lapped relation so as to be capable of passing each other in scissors fashion.

The fastener just described, and other fasteners of similar construction made from flat wire having a width more than twice the thickness of the metal, present a head of minimum protrusion above any surface against which the head rests, and they possess the further advantage that legs 42 and 42' are exceptionally stiff, though the fastener is quite resilient because the arms 39 and 40 are somewhat more yielding and resilient than arms constructed of round wire.

Figures 10, 11:
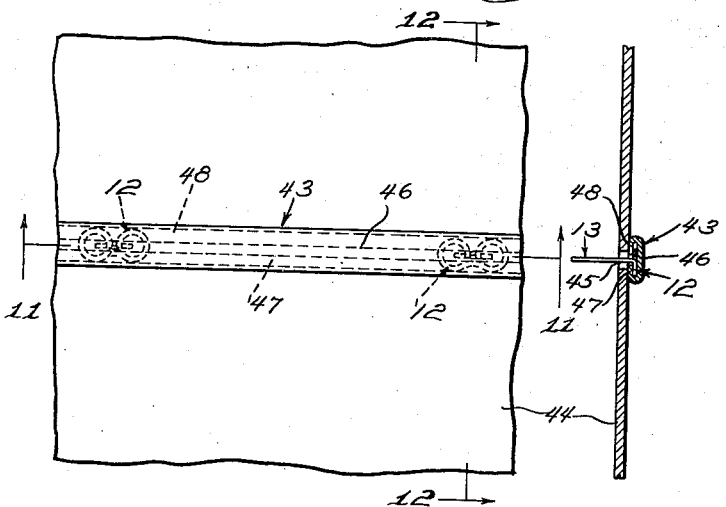
Figure 10 is a fragmentary plan view illustrating a preferred use of the fastener of the present invention in the securing of a hollow molding upon a perforated metallic supporting structure.
Figure 11 is a sectional view taken on the plane indicated by the line 11—11 in Figure 10.
Figure 12:
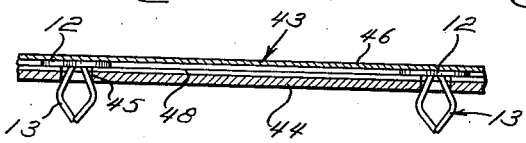
Figure 12 is a sectional view taken on the plane indicated by the line 12—12 in Figure 10.

The fastener just described in its various forms, is peculiarly useful in the securing of small hollow metal finishing moldings to metallic supporting structures of various kinds, for example in securing unusually small hollow moldings in which the inturned flanges are spaced apart only a small distance. Such an arrangement is illustrated in Figures 10, 11 and 12 of the drawing in which 43 is the hollow molding and 44 the structure to which it is secured, said structure being provided with perforations 45 for the reception of the entering parts of the fasteners. The hollow molding 43 comprises a body 46 and inturned flanges 47 and 48 turned inwardly under the body 46 in spaced relation thereto. In some installations the inturned flanges 47 and 48 terminate relatively close to each other providing only a very narrow slot.

The fastener of the present invention is particularly adapted for the securing of such moldings and, to this end, the elongated heads 12, referring to the form of the invention illustrated in Figures 1 and 2, are slid in endwise of the molding, the shank 13 protruding from the inside of the molding between the inturned flanges 47 and 48. Preferably the symmetrical loops 14 and 15 fit snugly between opposite walls of the molding so that the fasteners are held from free sliding in the molding and from any rotation therein. The protruding shanks 13, accordingly, once the fasteners are positioned in the molding, are firmly held for the insertion of said shanks into the openings 45 of the supporting structure 44. Of course, the fasteners are located at points along the length of the molding so that they will approximately register with the openings in the supporting structure. In case of any slight misalignment of the protruding end of the fastener with respect to the opening, it will be understood that the wedge formed by the entering end of the shank by engagement with the wall of the opening will serve to shift the fastener longitudinally of the molding to bring it into accurate position opposite the opening.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-piece wire spring stud fastener, comprising an elongated head in the general form of the numeral 3, and formed from the mid-portion of the piece of wire, and a shank consisting of two outwardly bowed legs formed from the wire ends and carried respectively by the free ends of the loops forming said numeral, said legs being overlapped at the end of the shank remote from said head.

2. A one-piece spring stud fastener complete in itself formed entirely from flat wire having a uniform width at least twice its thickness, comprising a head in the approximate form of the numeral 3 and having a thickness corresponding to the thickness of said wire, and a shank comprising only two outwardly bowed legs connected to said head by sidewise bends in the wire, said legs having edgewise bends in the wire to form the bow in each leg and being arranged in lapped relation at the end of the shank.

BION C. PLACE.